United States Patent
Zou et al.

(10) Patent No.: US 10,886,549 B2
(45) Date of Patent: Jan. 5, 2021

(54) CATALYST COATED MEMBRANES AND PREPARATION METHODS FOR FUEL CELLS

(71) Applicants: Daimler AG, Stuttgart (DE); Ford Motor Company, Dearborn, MI (US)

(72) Inventors: Yuquan Zou, Surrey (CA); Scott McDermid, Vancouver (CA); Massimiliano Cimenti, North Vancouver (CA); Shun-wen Amy Yang, Burnaby (CA); Liviu Catoiu, New Westminster (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 289 days.

(21) Appl. No.: 15/961,916

(22) Filed: Apr. 25, 2018

(65) Prior Publication Data
US 2018/0323459 A1 Nov. 8, 2018

Related U.S. Application Data

(60) Provisional application No. 62/502,635, filed on May 6, 2017.

(51) Int. Cl.
*H01M 8/1004* (2016.01)
*H01M 4/88* (2006.01)
(Continued)

(52) U.S. Cl.
CPC ......... *H01M 8/1004* (2013.01); *H01M 4/881* (2013.01); *H01M 4/8814* (2013.01);
(Continued)

(58) Field of Classification Search
CPC . H01M 2008/1095; H01M 2300/0082; H01M 2300/0094; H01M 4/881;
(Continued)

(56) References Cited

U.S. PATENT DOCUMENTS

| 5,547,551 A | 8/1996 | Bahar et al. |
| 6,517,962 B1 | 2/2003 | Knights et al. |

(Continued)

FOREIGN PATENT DOCUMENTS

| EP | 1998393 A1 | 12/2008 |
| WO | 2013064640 A1 | 5/2013 |

*Primary Examiner* — Lingwen R Zeng
(74) *Attorney, Agent, or Firm* — Patent Central LLC; Stephan A. Pendorf

(57) ABSTRACT

Simplified methods are disclosed for preparing a catalyst coated membrane that is reinforced with a porous polymer sheet (e.g. an expanded polymer sheet) for use in solid polymer electrolyte fuel cells. The methods involve forming a solid polymer electrolyte membrane by coating membrane ionomer solution onto a first catalyst layer and then applying the porous polymer sheet to the membrane ionomer solution coating, while it is still wet, such that the membrane ionomer solution only partially fills the pores of the porous polymer sheet. A second catalyst ink is then applied which fills the remaining pores of the porous polymer sheet. Not only are such methods simpler than many conventional methods, but surprisingly this can result in a marked improvement in fuel cell performance characteristics.

24 Claims, 5 Drawing Sheets

(51) Int. Cl.
*H01M 8/1023* (2016.01)
*H01M 8/1039* (2016.01)
*H01M 8/1053* (2016.01)
*H01M 8/1086* (2016.01)
*H01M 8/1081* (2016.01)
H01M 8/1018 (2016.01)
H01M 8/1067 (2016.01)

(52) U.S. Cl.
CPC ......... *H01M 4/8828* (2013.01); *H01M 8/109* (2013.01); *H01M 8/1023* (2013.01); *H01M 8/1039* (2013.01); *H01M 8/1053* (2013.01); *H01M 8/1081* (2013.01); *H01M 8/1067* (2013.01); *H01M 2008/1095* (2013.01); *H01M 2300/0082* (2013.01); *H01M 2300/0094* (2013.01); *Y02E 60/50* (2013.01); *Y02P 70/50* (2015.11)

(58) Field of Classification Search
CPC ............. H01M 4/8814; H01M 4/8828; H01M 8/1004; H01M 8/1023; H01M 8/1039; H01M 8/1053; H01M 8/1067; H01M 8/1081; H01M 8/109; Y02E 60/50; Y02P 70/50

See application file for complete search history.

(56) References Cited

U.S. PATENT DOCUMENTS

| | | |
|---|---|---|
| 6,936,370 B1 | 8/2005 | Knights et al. |
| 2007/0269698 A1* | 11/2007 | Gu .................... H01M 8/1058 429/483 |
| 2013/0002289 A1 | 1/2013 | Toba |
| 2013/0142946 A1* | 6/2013 | Houghtaling ....... H01M 4/8807 427/115 |
| 2013/0202986 A1* | 8/2013 | Moose ................ H01M 8/1004 429/482 |

* cited by examiner

CATALYST COATED MEMBRANES AND PREPARATION METHODS FOR FUEL CELLS

BACKGROUND

Field of the Invention

This invention relates to simplified methods for fabricating a catalyst coated membrane (CCM) comprising a reinforcement layer of a porous polymer sheet, e.g. an expanded polymer sheet, for solid polymer electrolyte membrane fuel cells. The invention further relates to CCM structures which exhibit improved voltage reversal tolerance.

Description of the Related Art

Fuel cells electrochemically convert fuel and oxidant reactants, such as hydrogen and oxygen or air respectively, to generate electric power. Solid polymer electrolyte fuel cells are a type of fuel cell which employs a proton conducting, solid polymer membrane electrolyte (e.g. perfluorinated sulfonic acid ionomer) between cathode and anode electrodes. Gas diffusion layers are typically employed adjacent each of the cathode and the anode electrodes to improve the distribution of gases to and from the electrodes. In a typical fuel cell, flow field plates comprising numerous fluid distribution channels for the reactants are provided adjacent the gas diffusion layers to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1 V, a plurality of cells is usually stacked together in series for commercial applications. Fuel cell stacks can be further connected in arrays of interconnected stacks in series and/or parallel for use in automotive applications and the like.

To simplify the manufacture of solid polymer electrolyte fuel cells and stacks, components known as catalyst coated membranes (CCMs) are usually initially prepared in which an anode and a cathode are bonded in layer form to opposite sides of a membrane electrolyte layer. Each of the anode and cathode comprise appropriate catalysts. Thus, a CCM is a bonded, layered assembly comprising an anode catalyst layer, a membrane electrolyte layer, and a cathode catalyst layer.

Among the many known methods for preparing CCMs, decal transfer methods are probably the most commonly used. In this approach, anode and cathode catalyst layers are pre-coated separately onto supporting substrates, which is then followed by a hot bonding process that laminates the two catalyst layers to the electrolyte membrane. The laminating of the catalyst layers can be done either simultaneously or sequentially. Although decal transfer methods have merits, they also have several disadvantages. For instance, a decal transfer step is a relatively slow process and requires the use of a laminator, which adds extra cost to the processing. Further, the integrity of the electrolyte membrane layer can be compromised during the hot bonding process, especially when the membrane layer is thin (e.g. <10 μm) and the catalyst layers are rough. And further still, defects such as wrinkles can be introduced in the assembly during decal transfer processes, which can significantly reduce manufacturing yield and thus increase cost.

Much effort has been devoted to address the aforementioned issues with decal transfer. For instance, direct coating of the catalyst layers onto the electrolyte membrane via various coating techniques (such as spray coating or inkjet printing) has been adopted to avoid decal transfer steps. However, the solvents (e.g. $H_2O$ and alcohol) in the typical catalyst inks significantly swell the electrolyte membrane during coating and this leads to significant cracking of the catalyst layers during subsequent drying, thereby compromising the integrity of the membrane-catalyst interface.

More recently, a new approach has emerged, which allows the direct coating of catalyst and ionomer layers on top of each other. WO2013/064640 discloses an "integral" approach to first coat the cathode layer onto a supporting substrate, followed by electrolyte membrane coating, in which an expanded polytetrafluoroethylene (ePTFE) substrate pre-impregnated with ionomer dispersion is introduced and then adhered to the cathode layer. Finally, the anode layer is coated onto the membrane ionomer layer to form the CCM. In this approach, only one ePTFE sheet is used for mechanical reinforcement of the CCM. In other approaches, more than one reinforcement layer may be employed in CCM fabrication. For instance, US20130202986 discloses a fuel cell construction comprising a reinforced electrode assembly comprising first and second porous reinforcement layers.

The incorporation of one or more reinforcement layers in a CCM also advantageously provides improved mechanical strength and in-plane hydration stability (i.e. the dimensional stability of the CCM in the planar directions as a function of hydration state). This is important with regards to long-term durability of commercial fuel cell stacks. For instance, U.S. Pat. No. 5,547,551 or EP1998393 discloses the incorporation of a reinforcement layer (e.g. ePTFE) in the middle of electrolyte membrane. The swelling of the ionomer layer can be constrained by such a reinforcement layer.

A problem associated with large series stacks of fuel cells is that, if for some reason a cell (or cells) in the series stack is not capable of delivering the same current being delivered by the other cells in the stack, that cell or cells may undergo voltage reversal. Depending on the severity and duration of the voltage reversal, the cell may be irreversibly damaged and there may be an associated loss in cell and stack performance. Thus, it can be very important in practical applications for the cells in large series stacks to either be protected against voltage reversal or alternatively to have a high tolerance to voltage reversal.

A voltage reversal condition can arise for instance due to a fuel starvation condition existing on the fuel cell anode (i.e. where the anode receives insufficient fuel for intended operation). A fuel starvation condition can happen during start up from below freezing temperatures as a result of ice blockages in the anode, or during operation at normal operating temperatures as a result of anode "flooding" (where liquid water blocks passageways in the anode). It is well recognized that such conditions can lead to cell voltage reversal due to the associated rise of anode potential, and further can lead to corrosion of the carbon supports which are typically used to support the anode catalyst (typically platinum). As a consequence of this corrosion, a loss in effective platinum surface area occurs at the anode and cell function is degraded. Therefore, a voltage reversal tolerant anode is an important design requirement for the anodes in commercial fuel cell stacks.

There are several ways to improve fuel cell anodes for purposes of voltage reversal tolerance. For example, increasing the Pt catalyst loading used and using catalysts that are more resistant to oxidative corrosion can help. Further, in one well studied approach, a suitable secondary catalyst material is incorporated into the anode to facilitate water hydrolysis (also known as the oxygen evolution reaction or OER). By promoting water hydrolysis over the reactions causing corrosion of the anode catalyst supports, voltage reversal tolerance can be significantly improved. This approach is described for instance in U.S. Pat. Nos. 6,517,962 and 6,936,370 in which the incorporated secondary catalyst materials for promoting OER included ruthenium, iridium, and/or their oxides.

In the art, different ways have been disclosed for introducing such a secondary OER catalyst into the anode. The OER catalyst may be mixed directly with the primary anode catalyst (e.g. carbon supported Pt catalyst). Alternatively, the secondary OER catalyst may be incorporated in a distinct, separate layer (e.g. a bilayer design as disclosed in US2013/002289). The former method is straightforward and more cost-effective compared to the latter. However, the observed activity of the OER catalyst using the former method is lower than that using the latter method. Thus it is apparent that the structure of the anode layer as a whole can have a significant impact on the effectiveness and function of any incorporated OER catalyst.

There remains a need in the art to simplify and improve the preparation process of CCMs by preferably avoiding the use of decal transfer processes and while preferably obtaining a product with improved mechanical strength and stability. Further, there is a need to improve the reactivity of OER catalyst incorporated into the anode catalyst layers for purposes of voltage reversal tolerance in order to lower the required loading of OER catalyst and reduce cost. The present invention fulfills these and other needs.

SUMMARY

An aspect of the present invention relates to a simplified method of preparing a catalyst coated membrane (CCM) assembly for a solid polymer electrolyte fuel cell. Other aspects of the invention relate to improved CCM assemblies which can be made using this simplified method and to improved solid polymer electrolyte fuel cells and stacks made with these improved CCM assemblies. The improved CCM assemblies and solid polymer electrolyte fuel cells made therewith can be characterized by substantially improved voltage reversal tolerance.

A relevant CCM assembly of the invention comprises a solid polymer electrolyte membrane comprising a proton-conducting membrane ionomer, first and second catalyst layers comprising first and second catalysts respectively and first and second ionomers respectively and bonded to opposite sides of the solid polymer electrolyte, and a porous polymer sheet at the interface between the second catalyst layer and the solid polymer electrolyte membrane and bonded to both. In this assembly, the pores of the porous polymer sheet comprise the solid polymer membrane electrolyte and the second catalyst layer. The method comprises the general steps of:

coating a first catalyst ink comprising the first catalyst and the first ionomer onto a supporting substrate;

drying the first catalyst ink coating, thereby forming the first catalyst layer;

coating a membrane ionomer solution comprising the membrane ionomer onto the first catalyst layer;

applying the porous polymer sheet to the wet membrane ionomer solution coating wherein the membrane ionomer solution partially fills the pores of the porous polymer sheet;

drying and annealing the membrane ionomer coating, thereby forming the solid polymer electrolyte membrane;

applying a second catalyst ink comprising the second catalyst and the second ionomer to the porous polymer sheet wherein the second catalyst ink fills the remaining pores of the porous polymer sheet; and drying the second catalyst ink coating, thereby forming the second catalyst layer.

The above steps need not all be performed in the order listed above and certain variations in ordering are possible, particularly with regards to the drying and annealing steps. For instance, while it believed preferable to complete the annealing step prior to applying the second catalyst ink (to minimize swelling of the membrane layer and subsequent cracking of the second catalyst layer), it is possible to do the annealing after applying and drying the second catalyst ink.

In one embodiment of the invention and as exemplified in the Examples below, the first catalyst layer is a cathode layer and thus the second catalyst layer is an anode layer.

In another embodiment of the invention and again as exemplified in the Examples below, the porous polymer sheet is an expanded polymer sheet.

The invention is suitable for use with various types of membrane ionomer. For instance, the membrane ionomer can comprise either perfluorosulfonic acid ionomer or hydrocarbon ionomer.

A suitable membrane ionomer solution can comprise greater than about 16% (e.g. about 24%) by weight of membrane ionomer solids. Further, it can be characterized by a viscosity greater than about 90 centipoise. A suitable membrane ionomer solution may also comprise a solvent mixture, e.g. of an alcohol, such as n-propanol, and water in a ratio greater than about 60:40 by weight of alcohol to water.

An improved CCM assembly can be made according to the aforementioned method. As demonstrated in the Examples below, in such embodiments the first catalyst layer can be a cathode layer and the second catalyst layer can be an anode layer. The membrane ionomer can comprise perfluorosulfonic acid ionomer. The first and second ionomers can also comprise perfluorosulfonic acid ionomer. The various perfluorosulfonic acid ionomers employed for the membrane, first, and second ionomers may be the same type or different (e.g. having the same equivalent weight or alternatively having different equivalent weights).

The porous polymer sheet employed in the CCM assembly can be an expanded polymer sheet, such as an expanded polytetrafluoroethylene sheet. A suitable porosity of such an expanded polymer sheet is between 60 and 90% (e.g. about 70%). A suitable thickness of the expanded polymer sheet is from about 4 to 8 micrometers thick (e.g. about 4 micrometers).

In a CCM assembly of the invention in which an expanded polymer sheet is employed, the CCM assembly may be characterized by pores in about 0.2 micrometers of the thickness of the expanded polymer sheet being filled with the anode catalyst layer. Alternatively, it may be characterized by pores in greater than about 1% (e.g. about 5%) of the thickness of the expanded polymer sheet being filled with the anode catalyst layer.

Further areas of applicability of the present invention will become apparent from the detailed description provided hereinafter.

DETAILED DESCRIPTION

Herein, in a quantitative context, the term "about" should be construed as being in the range up to plus 10% and down to minus 10%.

The term "annealing" is used herein in the context of heat treating the electrolyte membrane and should be construed as heating at temperatures greater than 100° C. "Drying" can obviously be accomplished as a consequence of heating to such temperatures and thus drying can be performed as part of an annealing process. However, drying may instead be accomplished at lower temperatures, including ambient or even below ambient temperatures.

Aspects of the present invention include the use of a porous polymer sheet and particularly an expanded polymer sheet (e.g. ePTFE or other fluorinated materials) as a reinforcement layer to reinforce both the polymer electrolyte membrane and the anode layer in a fuel cell CCM and thereby improving several mechanical characteristics of the CCM. Further, it includes a simplified and faster method of preparing such CCMs (when compared to conventional decal transfer methods) in which fewer supporting substrates (also known as backing layers) and coating steps are typically involved. And further still, it includes improved CCM structures that lead to better fuel cell performance characteristics. Preparing a CCM in accordance with the method of the invention appears to provide subtle changes in CCM structure that in turn result in improved performance characteristics. In particular, marked improvements in reversal tolerance can be obtained in embodiments employing secondary OER catalysts in the anode catalyst layer.

In the simplified method of the present invention, a CCM is fabricated without using separately prepared electrolyte membrane sheets and without using slower, costly decal transfer steps during preparation. Instead, the electrolyte membrane is formed in place during the preparation process from coated membrane ionomer solution. Further, the reinforcing porous polymer sheet is only partially filled with membrane ionomer with the remainder being filled by appropriate catalyst layer.

Figure 1:
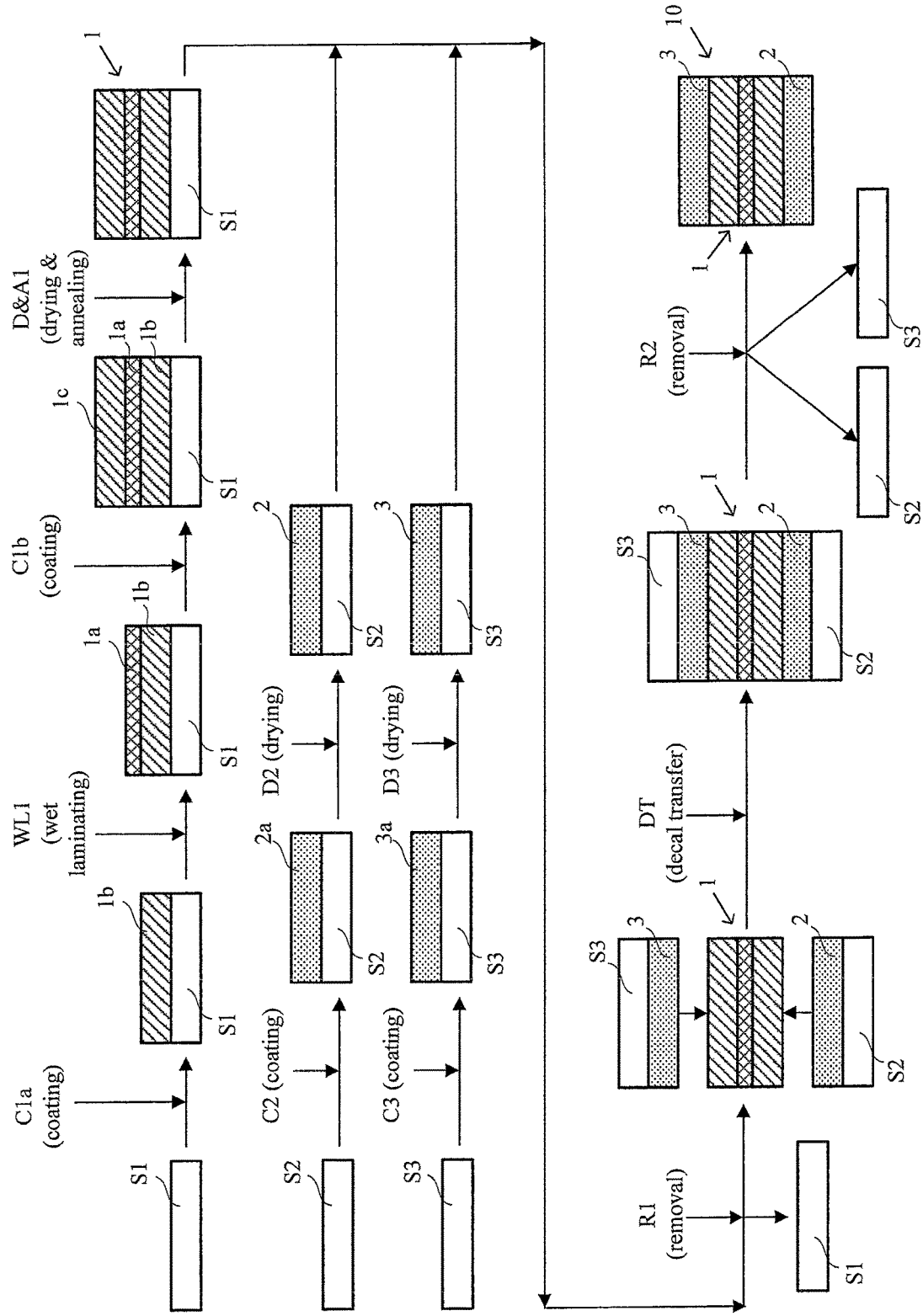
FIG. 1 shows a schematic illustration of a prior art decal transfer method for preparing a CCM.

For comparison purposes, FIG. 1 shows a schematic illustration of a typical prior art decal transfer method for preparing a CCM. Overall, this method involves four coating steps with three associated supporting substrates (i.e. substrates used to provide a supporting backing for coating purposes but which are not part of the final product) along with a final decal transfer step. In this exemplary method, e-PTFE reinforced electrolyte membrane 1, anode catalyst layer 2, and cathode catalyst layer 3 are initially prepared on separate supporting substrates S1, S2, and S3 respectively. For mass production purposes, these are all usually prepared by web coating an appropriate coating or coatings onto suitable supporting webs. Various traditional coating techniques such as blade, slot die, curtain coating, roll coating etc. may be employed. And exemplary supporting substrates include, but are not limited to, traditional fluorinated materials such as PTFE, ETFE, FEP, PFA, ECTFE, and non-fluorinated substrates such as PET coated with release agents.

To prepare a web of e-PTFE reinforced electrolyte membrane 1 on supporting substrate S1, a first web coating step C1a is performed in which membrane ionomer solution 1b is web coated onto a moving web of supporting substrate S1. (Suitable membrane ionomers for use in CCMs include Nafion® type, Dow type short-side chain polyfluorosulfonic acid "PFSA", hydrocarbon type ionomers, and the like.) While this coating is still wet, a web layer of e-PTFE 1a is applied in a wet lamination step WL1 onto the surface of the coated ionomer solution 1b. This is followed by a second web coating step C1b in which an additional amount of membrane ionomer solution 1c is web coated onto e-PTFE layer 1a. The entire coated supporting substrate assembly is then dried and annealed in a drying and annealing step D&A1 to complete the preparation of the web of e-PTFE reinforced electrolyte membrane 1 on supporting substrate S1.

To prepare a web of anode catalyst layer 2 on supporting substrate S2, a web coating step C2 is performed in which anode catalyst ink 2a is web coated onto a moving web of supporting substrate S2. This coating is then dried in a drying step D2, thereby completing the preparation of the web of anode catalyst layer 2 on supporting substrate S2. In a like manner, a web of cathode catalyst layer 3 is prepared on supporting substrate S3 via web coating step C3 in which cathode catalyst ink 3a is web coated onto a moving web of supporting substrate S3. This coating is also dried in a drying step D3, thereby completing the preparation of the web of cathode catalyst layer 3 on supporting substrate S3.

Figure 2:
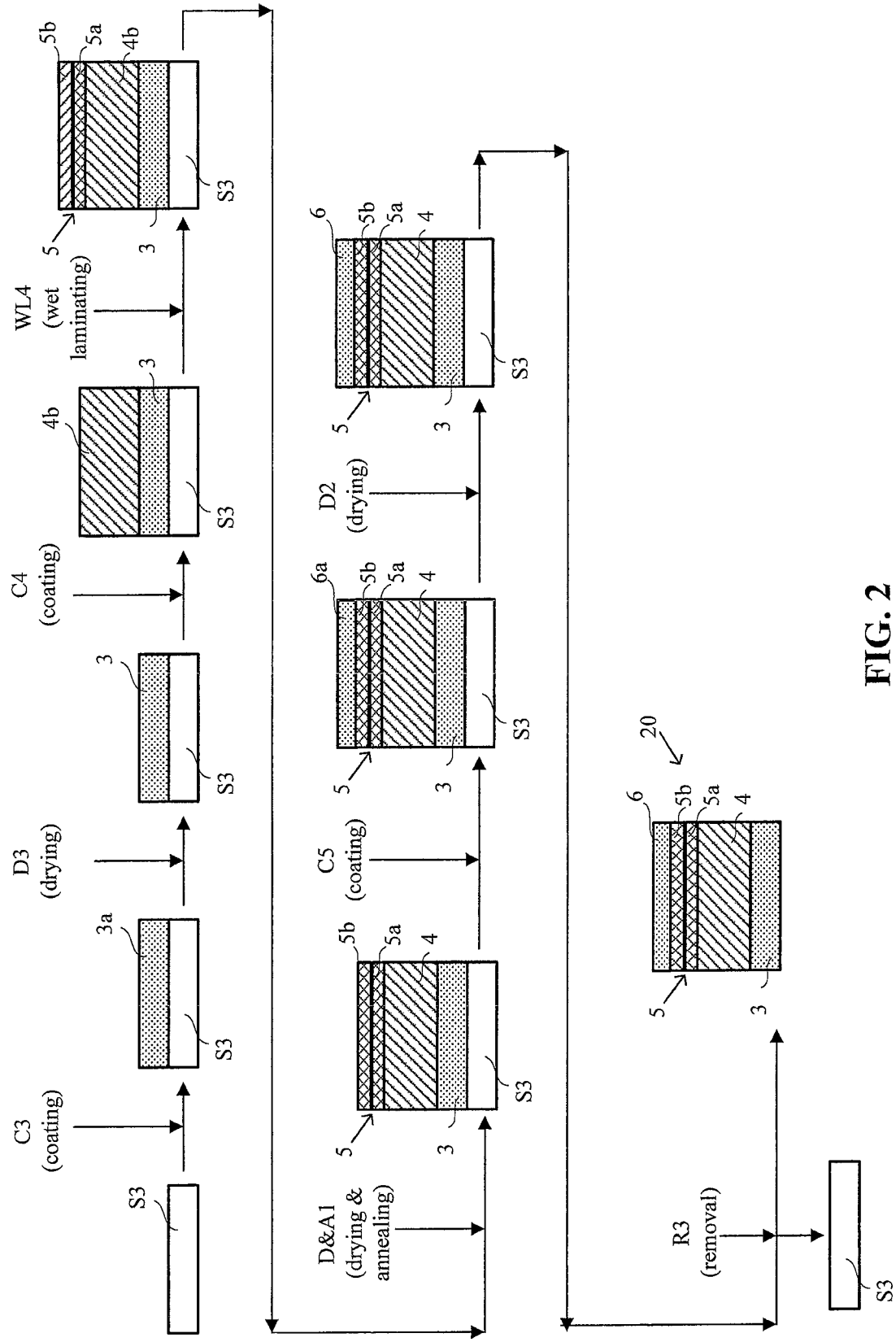
FIG. 2 shows a schematic illustration of a simplified method of the invention for preparing a CCM in which an expanded polymer sheet is applied to a membrane ionomer solution coating while it is still wet, such that the solution only partially fills the pores of the expanded polymer sheet.

To complete the preparation of CCM 10 in FIG. 1, substrate S1 is peeled off the assembly in a removal step R1 and the webs comprising anode catalyst layer 2 on supporting substrate S2 and cathode catalyst layer 3 on supporting substrate S3 are then oriented such that electrode layers are adjacent the exposed surfaces of electrolyte membrane 1 as shown. Anode catalyst layer 2 and cathode catalyst layer 3 are then bonded to opposite sides of electrolyte membrane 1 using a combination of heat and pressure in decal transfer step DT. Finally, supporting substrates S2 and S3, which were releasably attached to these catalyst layers, are peeled off in removal step R2, thereby completing the preparation of CCM 10. (In actual practice, for handling purposes, the various supporting substrates are usually kept in place until the assembly process requires their removal. So for instance, CCM 10 would not typically appear as a free-standing component as illustrated in FIG. 2. Instead, substrates S2 and S3 would be removed only as CCM 10 is incorporated into a MEA or otherwise into a fuel cell.)

An exemplary method of the invention however is shown in the schematic illustration of FIG. 2. Unlike the more complicated method shown in FIG. 1, the method of FIG. 2 involves only three coating steps with a single supporting substrate and no decal transfer step. And of even greater advantage, the product CCM 20 enjoys certain performance benefits over that produced in FIG. 1. Note that in FIG. 2 and in the following description, those elements and method steps that are essentially the same as those in FIG. 1 have been denoted with the same identifying alphanumeric characters.

Initially in FIG. 2, and in a similar manner as was done in FIG. 1, cathode catalyst ink 3a is web coated onto a moving web of supporting substrate S3 in web coating step C3. As above, this coating is then dried in a drying step D3, thereby preparing a web of cathode catalyst layer 3 on supporting substrate S3. Next, in a single web coating step C4, membrane ionomer solution 4b is web coated onto the cathode catalyst layer surface of the aforementioned web comprising cathode catalyst layer 3 on supporting substrate S3. While the coating of ionomer solution 4b is still wet, a web layer of e-PTFE 5 is applied in a wet lamination step WL4 onto the surface of the coated ionomer solution 4b. Ionomer solution 4b penetrates a portion 5a of e-PTFE layer 5, partially filling those pores on the side contacting the wet solution. Importantly however, ionomer solution 4b does not penetrate the entire e-PTFE layer 5 and the pores in a certain portion 5b of e-PTFE layer 5 remain unfilled at this point in the method. This assembly is then dried and annealed in a similar manner as in FIG. 1 via drying and annealing step D&A1 and thereby completing the preparation of e-PTFE reinforced electrolyte membrane 4. Next, anode catalyst ink 6a is web coated via web coating step C5 onto the surface of portion 5b of e-PTFE layer 5 thereby filling the remaining pores in portion 5b while additionally depositing a sufficiently thick coating to form the intended anode catalyst layer 6. As before, this coating is dried in a drying step D2. Finally, supporting substrate S3 is peeled off in removal step R3, thereby completing the preparation of inventive CCM 20.

Figure 2A:
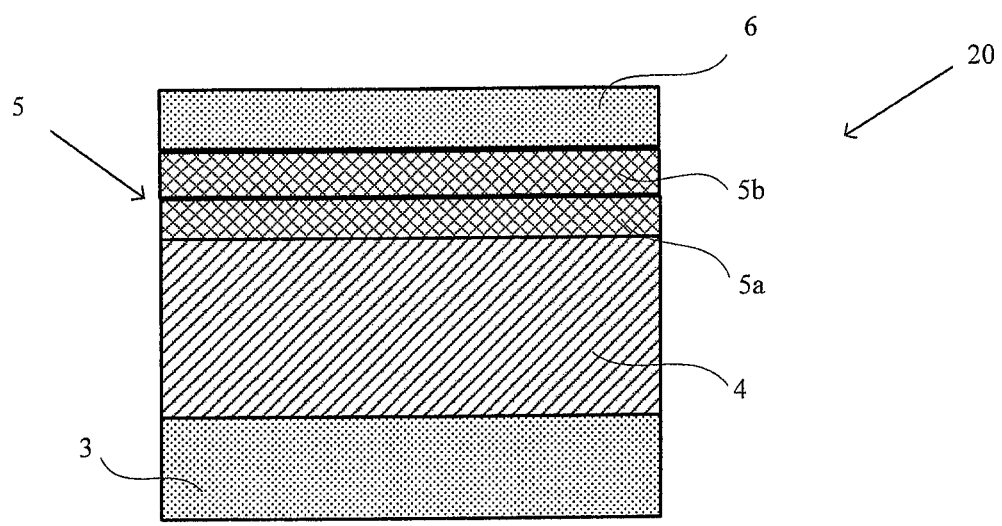
FIG. 2a shows a detailed view of the structure of the CCM prepared in FIG. 2.

FIG. 2a shows a detailed view of the structure of CCM 20. e-PTFE reinforced electrolyte membrane 4 is bonded on one side to cathode catalyst layer 3 and on the opposite side to anode catalyst layer 6. e-PTFE layer 5 serves as a bridging layer or interface between electrolyte membrane 4 and anode catalyst layer 6. The pores in portion 5a are filled with electrolyte membrane material while the pores in portion 5b are filled with anode catalyst layer material.

The method of FIG. 2 offers several advantages over the typical prior art decal transfer method of FIG. 1. Fewer coating steps and supporting substrates and of course no relatively slow, costly, and demanding decal transfer step is required. Further, as demonstrated in the Examples below, certain improved fuel cell performance characteristics are associated with the CCM structure illustrated in FIG. 2a. Generally, these improved characteristics may be a function of the characteristics of the expanded polymer sheet employed and of other aspects relating to the interface between the electrolyte membrane and catalyst layer. In particular, the penetration of the membrane electrolyte and the catalyst layer into the pores of the expanded polymer sheet may affect these characteristics. These characteristics can be modified by an appropriate choice of expanded polymer sheet or other suitable porous polymer sheet and by adjusting process parameters during preparation.

A suitable reinforcing porous polymer sheet material for use in the present invention is expanded PTFE (ePTFE). However, other porous expanded polymer sheet such as porous polypropylene (PP), porous polyvinylidene fluoride (PVDF), porous polyethersulfone (PES), and the like can be readily employed instead. Further, other types of porous polymer sheet may be considered (i.e. porous polymer sheet other than expanded polymer sheet). For instance, porous electrospun sheet and porous sheet made from nano-fibres may be considered. For expanded polymer sheet, representative sheet porosities range from about 60 to 90% and thicknesses from about 4 to 8 micrometers thick although other porosities and thicknesses may be considered. As is evident from the Examples below, improved CCM performance can certainly be obtained using expanded polymer sheets with porosities and thicknesses in these representative ranges. Further, improvements in CCM performance can be observed when the catalyst layer impregnates the pores in more than about 1% (e.g. 5%) of the expanded polymer sheet or alternatively when the catalyst layer impregnates the pores in at least about 0.2 micrometers of the thickness of the expanded polymer sheet.

The extent that the catalyst layer impregnates the pores of the porous polymer sheet in the inventive CCM can be controlled by controlling the extent that the membrane electrolyte had been impregnated beforehand. The factors influencing the extent that the membrane electrolyte impregnates the porous polymer sheet include characteristics of the polymer sheet itself, e.g. pore size, porosity, thickness, and also of the membrane ionomer solution employed. For instance, ionomer solutions of lower overall viscosity, and/or lower solids content can all increase the relative extent that the membrane ionomer solution impregnates the porous polymer sheet during preparation. Those skilled in the art are expected to be able to adjust such variables appropriately in order to get a desired impregnation amount.

In the exemplary embodiment of FIG. 2, a reinforcing e-PTFE layer is depicted at the membrane electrolyte/anode catalyst layer interface. Alternatively however, a reinforcing e-PTFE layer may be employed at the membrane electrolyte/cathode catalyst layer instead of or in addition thereto. If employed at the membrane electrolyte/cathode catalyst layer, relevant performance improvements associated with changes in this interface might be expected. Further, expanded polymer sheets other than e-PTFE and even porous polymer sheets other than expanded polymer sheets may be considered in the present invention. Further still, it is expected that the present methods and structures would be applicable for any type of membrane ionomer suitable for use in solid polymer electrolyte fuel cells (e.g. conventional perfluorosulfonic acid ionomer, hydrocarbon ionomer, and the like).

In addition, while the steps in the exemplary simplified method of FIG. 2 are shown in a certain order and combination, certain variations may be considered. For instance, the drying and the annealing of the membrane ionomer coating may be done in two separate steps and not concurrently as shown. If desired, the annealing step may, for example, be done after coating the second catalyst ink. The first catalyst ink coating should essentially be dried however before coating the membrane ionomer solution. Otherwise residual solvent from the catalyst ink could cause bubbles to form in the electrolyte membrane during drying. Note that in principle, one might also consider incorporating a reinforcing porous polymer sheet in a like manner at the interface between the first catalyst layer and the electrolyte, i.e. such that the first catalyst layer fills a small portion of the pores in the sheet while the remaining pores are filled with electrolyte membrane. An additional polymer sheet may indeed be incorporated at this first catalyst interface if desired. However, omitting the incorporation of a sheet at the second catalyst interface is not desirable. This is because the solvents in the catalyst inks generally result in severe swelling of the electrolyte membrane and thereafter any coated catalyst layer would crack.

Without being bound by theory, the fuel cell performance improvements associated with the methods and structures of the present invention are believed to result from improvements in the interface between the membrane electrolyte and the relevant catalyst layer. With regards to the cell reversal tolerance improvements evident in the following Examples, the e-PTFE layer is believed to serve as a bridging layer which stabilizes the anode catalyst layer (which includes both HOR or hydrogen oxidation reaction and OER catalysts) under cell reversal condition. In addition, the e-PTFE layer can restrict water transport from the anode and thus retain more water in the anode catalyst layer during cell reversal. The combination of these two hypothesized effects may explain the significant observed improvement in reversal tolerance and thus allow for a potential reduction in the loading of OER catalyst by more than 50%.

The following Examples have been included to illustrate certain aspects of the invention but should not be construed as limiting in any way.

Examples

Several experimental fuel cells were prepared using CCMs prepared either by a conventional decal transfer method or by the method of the invention. These cells were then subjected to voltage reversal tolerance testing and performance testing to compare their characteristics.

In all cases, the CCMs tested had cathode layers comprising a mixture of carbon supported platinum catalyst and perfluorosulfonic acid ionomer. The platinum loading in the cathode catalyst layers was 250 µg/cm$^2$ and the ionomer to carbon weight ratio in the layer was about 1:1. The anode layers comprised a mixture of: a different but similar carbon supported platinum catalyst (to serve as a HOR catalyst), an amount of oxide supported $IrO_2$ catalyst (to serve as an OER catalyst for voltage reversal purposes), and perfluorosulfonic acid ionomer. The platinum loading from the HOR catalyst in the anode catalyst layers was 50 µg/cm$^2$ and the ionomer to carbon weight ratio in the layer was again about 1:1. The source of OER ($IrO_2$) catalyst varied as indicated below (being either a commercially available grade from Umicore or a proprietary developmental type) and the loading also varied (being either 50 or 20 µg/cm$^2$). In all cases, the membrane electrolyte was perfluorosulfonic acid ionomer and the CCMs all comprised a reinforcing layer of expanded polytetrafluoroethylene sheet (ePTFE). In the Comparative Examples, commercially available ePTFE reinforced, GORE-SELECT® membrane (15 µm thick) was used. In the Inventive Examples, Nafion® dispersion was used to prepare the membrane electrolyte and the reinforcing ePTFE used was about 70% porous and about 4 micrometers thick.

CCMs for the Comparative Examples were made using a conventional decal transfer method in which decals of the cathode and anode layers were prepared first and were then applied to the above commercially obtained, ePTFE reinforced, membrane electrolyte (i.e. similar to the method illustrated in FIG. 1 except that the reinforced membrane electrolyte was obtained commercially). To prepare the decals, appropriate catalyst inks were prepared that consisted of the desired catalyst, distilled and deionized water, perfluorosulfonic acid polymer dispersion (namely Solvay 790 short side chain PFSA with an EW of 790), and n-propyl alcohol. The ratio of alcohol to water in all these inks was about 60/40 by weight. These mixtures were jar milled for several days to produce suitable catalyst ink slurries. The cathode and anode catalyst inks were then coated via Meyer bar onto sheets of ETFE and then dried at 55° C. in order to complete preparation of the cathode and anode decals. Finally, anode and cathode layers were then decal transferred to opposite sides of the commercial reinforced membrane via hot bonding under an applied force.

CCMs for the Inventive Examples were made using the method illustrated in FIG. 2. Initially, cathode catalyst layers were prepared on ETFE supporting substrates in a like manner to the coating and drying steps used to prepare decals of cathode layers for the CCMs of the Comparative Examples above (i.e. coating and drying steps C3 and D3). After drying, a layer of Nafion® ionomer dispersion (namely Nafion® 2029 long side chain PFSA with an EW of 875) was applied via Meyer bar to the cathode catalyst layer surface (i.e. web coating step C4). As indicated below, ionomer dispersions with different viscosities and solids content were used. While the ionomer layer was still wet, the reinforcing ePTFE sheet was wet laminated onto its surface (i.e. wet lamination step WL4) whereupon the ionomer solution penetrated a substantial portion of the ePTFE sheet by partially filling those pores on the side contacting the wet solution. The assemblies were allowed to dry at ambient temperature for about 10 minutes and thereafter they were heated at 150° C. for another 20 minutes to anneal the membrane ionomer coating (i.e. drying and annealing step D&A1). Finally, appropriate anode catalyst inks (prepared in a like manner to those used in the Comparative Examples) were applied via Meyer bar onto the surface of the ePTFE sheet (i.e. web coating step C5) thereby forming the anode catalyst layer coating while also filling the remaining pores in the ePTFE sheet. As indicated below, two different types of OER anode catalyst were employed at two different loadings. These coatings were then dried at 55° C. (i.e. drying step D2) to complete the preparation of the CCMs.

When preparing the Inventive CCMs, in order to adjust the extent that the membrane ionomer dispersion penetrated the ePTFE sheet, the viscosity of the dispersion used was adjusted by varying the solids content. In general, lower solids content and hence lower viscosity resulted in greater penetration of the pores in the ePTFE sheet. The ionomer dispersion used to make the CCM denoted as Inventive U/50/1 below had 18% solids content and a viscosity of about 70 centipoise. The ionomer dispersions used to make the CCMs denoted as Inventive U/50/5 and Inventive D/20/5 below however had solids content of 24% and a viscosity of about 90 centipoise.

Figure 3A:
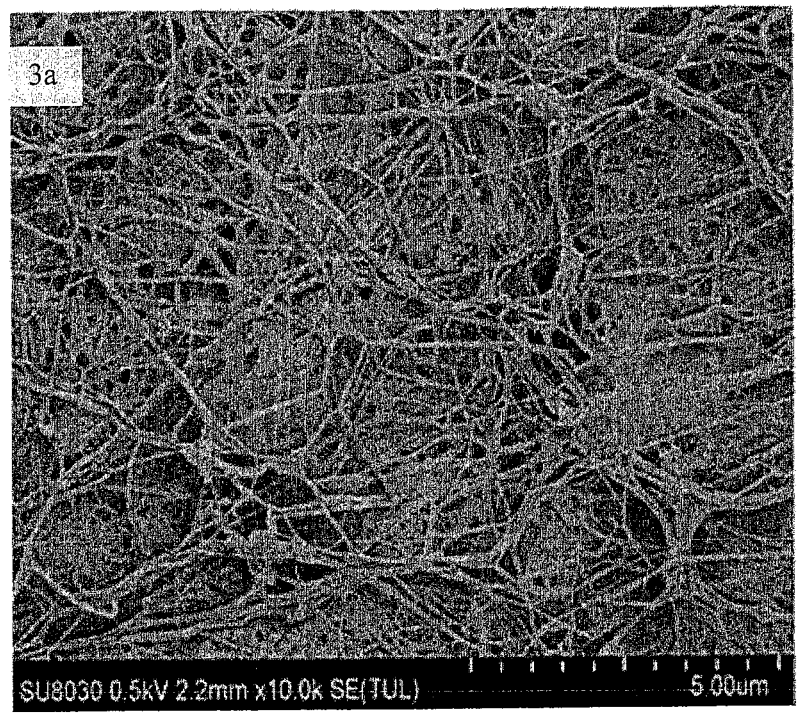
FIG. 3a shows an illustrative topographic SEM image during preparation of an Inventive CCM. The image is of the partially filled e-PTFE sheet just prior to applying the second anode catalyst ink.
Figure 3B:
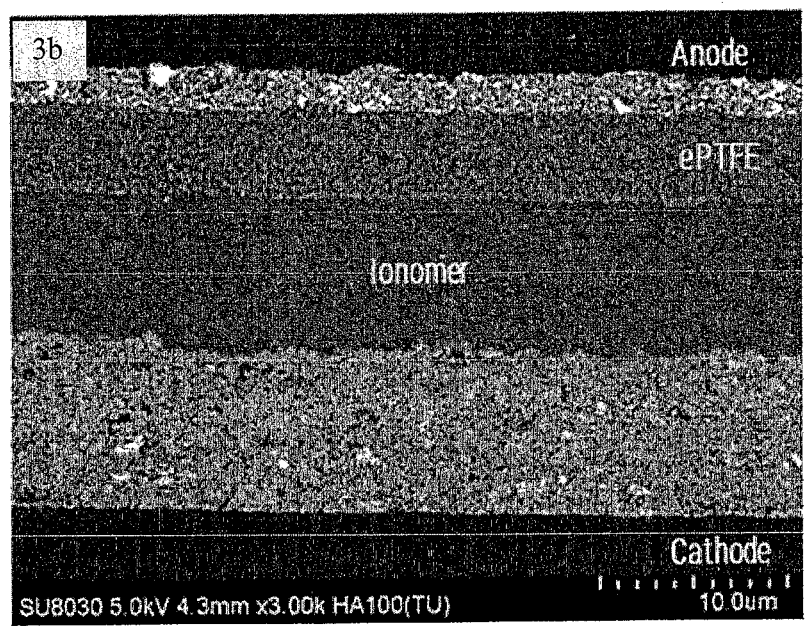
FIG. 3b show an illustrative cross-sectional SEM image of a complete Inventive CCM.

SEM imaging was used to study the CCM structure during fabrication and also to determine the extent that the membrane ionomer dispersion penetrated the ePTFE sheet in the Inventive CCMs. For instance, after drying and annealing the membrane ionomer solution during fabrication, topographic SEM images clearly showed porous PTFE fibrils on the surface of the solid ionomer/ePTFE background indicating that the ePTFE was not completely filled. (FIG. 3a shows such an illustrative topographic image.) From cross-sectional SEM images, a continuous interface was observed between the anode catalyst and the ionomer bridged by the ePTFE sheet. Such a continuous interface is suggestive of lower interfacial resistance, better bonding between the anode layer and the membrane electrolyte, and additional physical reinforcement of the anode by the ePTFE.sheet. In addition, estimates were obtained from cross-sectional SEM images of the extent that the membrane ionomer dispersion penetrated the ePTFE sheet and conversely how much of the ePFTE sheet was filled with anode catalyst layer. (FIG. 3b shows an illustrative cross-sectional image of an Inventive CCM. Note however that more detailed images at greater magnifications were used to estimate the ionomer penetration.) The CCM denoted as Inventive U/50/1 appeared to have less than about 1% of the ePTFE sheet thickness filled with anode catalyst. However, the CCMs denoted as Inventive U/50/5 and Inventive D/20/5 had about 5% of the ePTFE sheet thickness filled with anode catalyst (approximately equivalent to about 0.2 micrometers of the ePTFE thickness)

Table 1 below summarizes the CCMs prepared and their differing characteristics.

TABLE 1

| CCM identification | Anode OER type | Anode OER loading ($\mu g/cm^2$) | % ePTFE pores impregnated with anode |
|---|---|---|---|
| Comparative U/50 | Umicore | 50 | Not applicable |
| Inventive U/50/1 | Umicore | 50 | <~1% |
| Inventive U/50/5 | Umicore | 50 | 5% |
| Comparative D/20 | Developmental | 20 | Not applicable |
| Comparative D/50 | Developmental | 50 | Not applicable |
| Inventive D/20/5 | Developmental | 20 | 5% |

Membrane electrode assemblies (MEAs) were then prepared using each of the various CCMs for purposes of fuel cell testing. Each MEA was prepared by assembling the CCM between a pair of gas diffusion layers made from commercial carbon fibre papers from Freudenberg. The assemblies were bonded together under elevated temperature and pressure and placed between appropriate cathode and anode flow field plates to complete the experimental fuel cell constructions. The active area of the cells varied according to the intended testing. For polarization testing, the active area was 48 $cm^2$, while for voltage reversal testing, the active area was 25 $cm^2$. Cells were then conditioned by operating at a current density of 1.5 A/$cm^2$, with hydrogen and air as the supplied reactants at 100% RH, and at a temperature of 60° C. for at least 16 hours.

Figure 4:
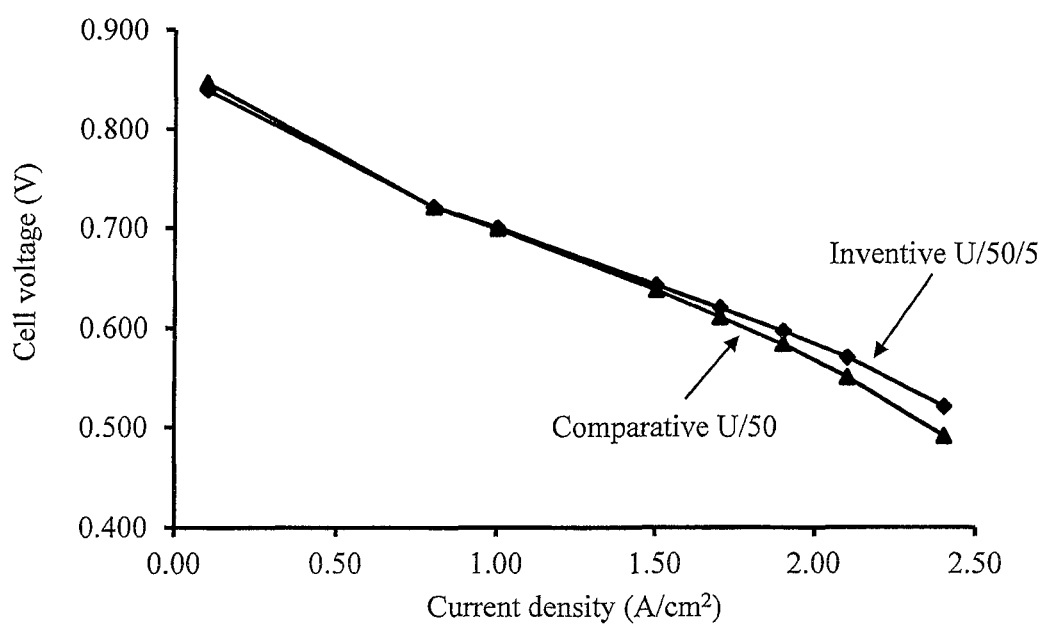
FIG. 4 compares the polarization curve (voltage versus current density) of the CCM of a Comparative Example to that of an Inventive Example.

The polarization performance characteristics (i.e. voltage versus current density from 0 to over 2 A/$cm^2$) of the cells made with the Comparative U/50 and Inventive U/50/5 CCMs were determined and compared under operating conditions similar to those expected during hill climbing in an automotive application (namely using hydrogen and air reactants at 60% relative humidity while operating at 92° C.). FIG. 4 compares the polarization curves of these cells. The data suggests that the Inventive CCM shows comparable or better performance (particularly at high current density) than the Comparative CCM. This might be explained by the fact that the Inventive CCM was formed by continuous coating, which could result in a significantly lower interfacial resistance than that for a conventional CCM prepared by decal transfer.

The voltage reversal characteristics of cells made with the Comparative and Inventive CCMs were also determined and compared. Two different testing modes, namely "extended" and "pulsed" voltage reversal modes, were applied to mimic different cell reversal situations in fuel cell stack operation. Both types of testing modes provide a measure of the relative robustness/tolerance to voltage reversal events for different anode catalyst layers and/or cell constructions.

The first testing mode, extended voltage reversal, simulates an extended reversal event occurring in a cell in a stack that is undergoing fuel starvation. Here, the cells are first operated at 60° C., with reactant humidities set at 60% RH, and at a current density of 1 A/$cm^2$ for 2 hours. The current is then turned off, then the reactant supply to the anode is switched from hydrogen to nitrogen instead, and then 0.2 A/$cm^2$ is forced through the cell, thereby subjecting it to voltage reversal conditions. Typically, the cell voltage would roughly plateau at a value between 0 and about −3 volts for a variable amount of time and then drop off suddenly to a value much less than −5 V, at which point testing ended. The length of time to this sudden drop off point is representative of the cell's ability to tolerate voltage reversal and is denoted here as the extended reversal tolerance.

The second testing mode, pulsed voltage reversal, simulates more closely the repetitive reversals that might be experienced by a cell in a stack undergoing fuel starvation. Here, the cells undergo repeated cycles comprising a fuel starvation portion followed by a normal operation portion. The fuel starvation portion consists of 2 minutes of reversal in which 0.2 A/$cm^2$ is forced through the cell with nitrogen at the anode followed by 2 minutes of reversal at 0.65 A/$cm^2$ (again with nitrogen at the anode). The normal operation portion consists of 5 minutes of normal operation at 0.65 A/$cm^2$. In this second testing mode, the cells were operated instead at 30° C., with reactant humidities set at 30% RH. The number of cycles that the cell can undergo before its voltage drops to a value much less than −5 V during reversal is again the point at which testing ended. The number of cycles to this sudden drop off point is also representative of the cell's ability to tolerate voltage reversal and is denoted here as the pulsed reversal tolerance.

Tables 2 and 3 below identify the fuel cells which were tested by the CCMs inside and summarize the extended reversal tolerance values and the pulsed reversal tolerance values obtained respectively.

TABLE 2

| CCM ID | Extended reversal tolerance (minutes) |
|---|---|
| Comparative U/50 | 300 |
| Inventive U/50/1 | 420 |
| Inventive U/50/5 | 1000 |
| Comparative D/20 | 6 |
| Comparative D/50 | 40 |
| Inventive D/20/5 | 38 |

TABLE 3

| CCM ID | Pulsed reversal tolerance (cycles) |
|---|---|
| Comparative U/50 | 65 |
| Inventive U/50/5 | 200 |

As is evident from Tables 2 and 3, for a given type of OER anode catalyst, the cells made with CCMs prepared by the inventive method showed substantially improved tolerance to reversal. Indeed, those cells made with CCMs whose ePTFE sheets were ~5% partially impregnated with anode catalyst were better than their comparative counterparts by more than a factor of 3 under both extended and pulsed reversal tolerance testing modes. (It was also noted that the intrinsic activity of the Developmental OER catalyst was markedly lower than that of the commercial Umicore OER catalyst.)

Further, from the several results obtained from the cells comprising the Developmental OER catalyst in Table 2, it appeared that use of the inventive method can allow for equivalent reversal tolerance to be obtained in cells with much lower OER catalyst loadings (e.g. comparing the equivalent results obtained from the Inventive D/20/5 based cell with only 20 μg/cm² OER loading to the Comparative D/50 based cell with 50 μg/cm² OER loading).

The preceding Examples not only demonstrate that acceptable CCMs can be prepared in a much simpler manner using the method of the invention, but also that performance and marked voltage reversal improvements can be obtained. The present invention can thus potentially allow for a substantial reduction in the amount of OER catalyst required for voltage reversal purposes in fuel cell stacks and hence allow for a corresponding substantial reduction in cost.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A method of preparing a catalyst coated membrane assembly for a solid polymer electrolyte fuel cell, the catalyst coated membrane assembly comprising a solid polymer electrolyte membrane comprising a proton-conducting membrane ionomer, first and second catalyst layers comprising first and second catalysts respectively and first and second ionomers respectively and bonded to opposite sides of the solid polymer electrolyte membrane, and a porous polymer sheet at the interface between the second catalyst layer and the solid polymer electrolyte membrane and bonded to both, and wherein the pores of the porous polymer sheet comprise the solid polymer membrane electrolyte and the second catalyst layer; the method comprising:
   coating a first catalyst ink comprising the first catalyst and the first ionomer onto a supporting substrate;
   drying the first catalyst ink coating, thereby forming the first catalyst layer;
   coating a membrane ionomer solution comprising the membrane ionomer onto the first catalyst layer;
   applying the porous polymer sheet to the wet membrane ionomer solution coating wherein the membrane ionomer solution partially fills the pores of the porous polymer sheet;
   drying and annealing the membrane ionomer coating, thereby forming the solid polymer electrolyte membrane;
   applying a second catalyst ink comprising the second catalyst and the second ionomer to the porous polymer sheet wherein the second catalyst ink fills the remaining pores of the porous polymer sheet; and
   drying the second catalyst ink coating, thereby forming the second catalyst layer.

2. The method of claim 1 wherein the first catalyst layer is a cathode layer and the second catalyst layer is an anode layer.

3. The method of claim 1 wherein the porous polymer sheet is an expanded polymer sheet.

4. The method of claim 1 wherein the membrane ionomer comprises perfluorosulfonic acid ionomer or hydrocarbon ionomer.

5. The method of claim 1 wherein the membrane ionomer solution comprises greater than about 16% by weight of membrane ionomer solids.

6. The method of claim 5 wherein the membrane ionomer solution comprises about 24% by weight of membrane ionomer solids.

7. The method of claim 1 wherein the membrane ionomer solution has a viscosity greater than about 90 centipoise.

8. The method of claim 1 wherein the membrane ionomer solution comprises a solvent mixture of an alcohol and water in a ratio greater than about 60:40 by weight of alcohol to water.

9. The method of claim 8 wherein the alcohol is n-propanol.

10. A catalyst coated membrane assembly made according to the method of claim 1.

11. The catalyst coated membrane assembly of claim 10 wherein the first catalyst layer is a cathode layer and the second catalyst layer is an anode layer.

12. The catalyst coated membrane assembly of claim 11 wherein the membrane ionomer comprises a perfluorosulfonic acid ionomer.

13. The catalyst coated membrane assembly of claim 12 wherein the first and second ionomers comprise a perfluorosulfonic acid ionomer with a different equivalent weight than that of the membrane ionomer.

14. The catalyst coated membrane assembly of claim 11 wherein the porous polymer sheet is an expanded polymer sheet.

15. The catalyst coated membrane assembly of claim 14 wherein the expanded polymer sheet is an expanded polytetrafluoroethylene sheet.

16. The catalyst coated membrane assembly of claim 14 wherein the porosity of the expanded polymer sheet is between 60 and 90%.

17. The catalyst coated membrane assembly of claim 16 wherein the porosity of the expanded polymer sheet is about 70%.

18. The catalyst coated membrane assembly of claim 14 wherein the expanded polymer sheet is from about 4 to 8 micrometers thick.

19. The catalyst coated membrane assembly of claim 18 wherein the expanded polymer sheet is about 4 micrometers thick.

20. The catalyst coated membrane assembly of claim 14 wherein the pores in about 0.2 micrometers of the thickness of the expanded polymer sheet are filled with the anode catalyst layer.

21. The catalyst coated membrane assembly of claim 14 wherein the pores in greater than about 1% of the thickness of the expanded polymer sheet are filled with the anode catalyst layer.

22. The catalyst coated membrane assembly of claim 21 wherein the pores in about 5% of the thickness of the expanded polymer sheet are filled with the anode catalyst layer.

23. A solid polymer electrolyte fuel cell comprising a catalyst coated membrane assembly made according to the method of claim 1.

24. A method of improving voltage reversal tolerance in a solid polymer electrolyte fuel cell comprising a catalyst coated membrane assembly, the method comprising making the catalyst coated membrane assembly according to the method of claim 2.

* * * * *